United States Patent
Takinoiri (10) Patent No.: US 10,225,501 B2
(45) Date of Patent: Mar. 5, 2019

(54) FOCUS ADJUSTMENT DEVICE AND FOCUS ADJUSTMENT METHOD

(71) Applicant: Olympus Corporation, Hachioji-shi, Tokyo (JP)

(72) Inventor: Satoshi Takinoiri, Yokohama (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 15/635,131

(22) Filed: Jun. 27, 2017

(65) Prior Publication Data
US 2018/0007295 A1 Jan. 4, 2018

(30) Foreign Application Priority Data
Jul. 1, 2016 (JP) .................................. 2016-131601

(51) Int. Cl.
| | |
|---|---|
| H04N 5/232 | (2006.01) |
| H04N 5/369 | (2011.01) |
| G02B 7/28 | (2006.01) |
| G03B 13/36 | (2006.01) |
| H04N 5/378 | (2011.01) |

(52) U.S. Cl.
CPC ............. H04N 5/3696 (2013.01); G02B 7/28 (2013.01); G03B 13/36 (2013.01); H04N 5/23212 (2013.01); H04N 5/232122 (2018.08); H04N 5/36961 (2018.08); H04N 5/378 (2013.01)

(58) Field of Classification Search
None
See application file for complete search history.

(56) References Cited

U.S. PATENT DOCUMENTS

| | | | |
|---|---|---|---|
| 8,582,018 B2 * | 11/2013 | Futami ..................... | G02B 7/08 348/326 |
| 9,088,710 B2 | 7/2015 | Okazawa et al. | |
| 2011/0267706 A1* | 11/2011 | Karasawa .............. | G02B 7/282 359/698 |
| 2012/0281131 A1* | 11/2012 | Isobe ..................... | G02B 7/343 348/345 |
| 2013/0321692 A1* | 12/2013 | Kawanishi ............. | G02B 7/102 348/345 |
| 2015/0103232 A1* | 4/2015 | Hamano ............ | H04N 5/23212 348/349 |
| 2016/0073012 A1* | 3/2016 | Shibuno ............. | H04N 5/23222 348/207.11 |
| 2016/0255267 A1* | 10/2016 | Takamiya .......... | H04N 5/23212 348/345 |

FOREIGN PATENT DOCUMENTS

| | | |
|---|---|---|
| JP | 2011-232684 | 11/2011 |
| JP | 2012-150289 | 8/2012 |

* cited by examiner

*Primary Examiner* — Twyler L Haskins
*Assistant Examiner* — Wesley J Chiu
(74) *Attorney, Agent, or Firm* — John C. Pokotylo; Pokotylo Patent Services (57) ABSTRACT

While a focus lens is moving to a focus lens driving target position, a controller of a focus adjustment device switches a moving speed of the focus lens from a first speed to a second speed. In particular, the controller calculates the number of times the defocus amount can be calculated when the focus lens moves at a predetermined speed in a section between a first position in which the moving speed is switched and a second position in which the focus lens starts being controlled to stop in the focus lens driving target position, and calculates the second speed based on the number of times, the first position and the focus lens driving target position.

8 Claims, 6 Drawing Sheets

FOCUS ADJUSTMENT DEVICE AND FOCUS ADJUSTMENT METHOD

CROSS-REFERENCE TO RELATED APPLICATION

This application is based upon and claims the benefit of priority from prior Japanese Patent Application No. 2016-131601, filed on Jul. 1, 2016, the entire contents of which are incorporated herein by reference.

BACKGROUND OF THE INVENTION

1. Field of the Invention

The present invention relates to a focus adjustment device for adjusting a focus of a focus lens in an image acquisition apparatus and a focus adjustment method for doing the same.

2. Description of the Related Art

Image acquisition apparatuses have an automatic focus adjustment function (what is called an autofocus (AF) function) to adjust a focus of a focus lens on a subject automatically. The AF function includes various types of systems. As one of the systems, a phase difference AF system is known. In this system, focusing is performed by the pupil division type phase difference detection system in response to a signal output from a focus detecting pixel row. In the phase difference AF system, overlap control may be performed. In the overlap control, a lens driving amount is updated by detecting a phase difference (calculating a defocus amount) during the driving of the focus lens as well as the stopping of the focus lens. The larger the defocus amount, the lower the accuracy of the lens driving amount to be calculated. Thus, the overlap control makes it possible to obtain a more correct focusing state by correcting the lens driving amount in sequence as the defocus amount is decreased by driving the focus lens.

It is desirable to drive the focus lens at high speed to shorten AF time when the foregoing overlap control is performed. If, however, the focus lens is driven at high speed, the overlap control cannot be performed in time and thus the focus lens may pass the focusing point. Jpn. Pat. Appln. KOKAI Publication No. 2011-232684 to Karasawa proposes a method of selecting a low driving speed of a focus lens when the focus lens is driven to move close to the focusing point.

BRIEF SUMMARY OF THE INVENTION

According to a first aspect of embodiments, there is provided a focus adjustment device including: a focus detector which calculates a defocus amount of an imaging optical system including a focus lens by phase difference detection; and a controller which moves the focus lens to a focus lens driving target position to adjust a focus of the focus lens based on the defocus amount output from the focus detector, wherein the controller switches a moving speed of the focus lens from a first speed to a second speed, while the focus lens is moving to the focus lens driving target position, wherein the controller calculates the number of times the focus detector is to calculate the defocus amount when the focus lens moves at a predetermined speed in a section between a first position in which the moving speed is switched and a second position in which the focus lens starts being controlled to stop in the focus lens driving target position, and calculates the second speed based on the number of times, the first position and the focus lens driving target position.

According to a second aspect of embodiments, there is provided a focus adjustment method for calculating a defocus amount of an imaging optical system including a focus lens by phase difference detection and moving the focus lens to a focus lens driving target position based on the calculated defocus amount to adjust a focus of the focus lens, the method including: while the focus lens is moving to the focus lens driving target position, switching a moving speed of the focus lens from a first speed to a second speed, wherein the switching including: calculating the number of times the defocus amount is to be calculated when the focus lens moves at a predetermined speed in a section between a first position in which the moving speed is switched and a second position in which the focus lens starts being controlled to stop in the focus lens driving target position; and calculating the second speed based on the number of times, the first position and the focus lens driving target position.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
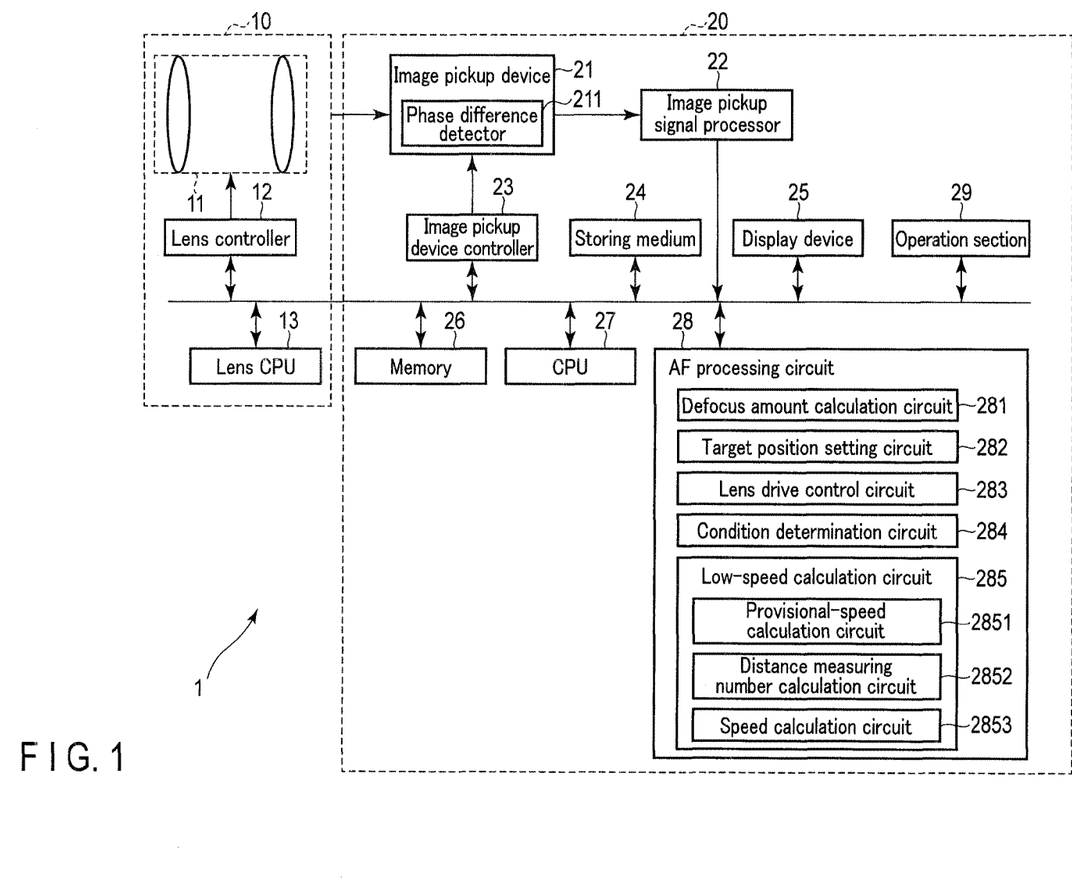
FIG. 1 is a block diagram showing an image acquisition apparatus to which a focus adjustment device according to an embodiment of the present invention is applied.

As shown in FIG. 1, the image acquisition apparatus 1 to which a focus adjustment device according to an embodiment of the present invention is applied includes a lens unit 10 and a camera body 20. The image acquisition apparatus 1 is of a lens exchange type. The focus adjustment device according to the embodiment can also be applied to an image acquisition apparatus of a lens-integrated type, such as a generally-used compact camera in which a lens cannot be attached to or detached from the camera body.

The lens unit 10 is detachably mounted on the camera body 20 through a lens mount (not shown) provided on the front of the camera body 20. The lens unit 10 includes a taking lens 11, a lens controller 12 and a lens CPU 13.

The taking lens 11 includes a plurality of optical lenses to form a subject image and the optical lenses include a focus lens.

The lens controller 12 moves the focus lens along the optical axis direction. The lens controller 12 is driven in response to a control signal from the lens CPU 13.

The lens CPU 13 drives and controls each of the sections in the lens unit 10, such as the lens controller 12. The lens CPU 13 is electrically connected to a CPU 27 and an AF processing circuit 28 in the camera body 20 via a communication connector (not shown). The lens CPU 13 receives drive control information from the AF processing circuit 28. The drive control information includes a focus lens driving target position OFδ and a driving speed. Based on the drive control information, the lens CPU 13 moves the focus lens in the optical axis direction through the lens controller 12 to focus the taking lens 11.

Though not shown, the lens unit 10 can be configured to include an aperture and an aperture controller to control the aperture. The lens CPU 13 receives information of an aperture amount from the CPU 27 in the camera body 20 and controls the aperture amount through the aperture controller based on the information.

The camera body 20 includes an image pickup device 21, an image pickup signal processor 22, an image pickup device controller 23, a storage medium 24, a display device 25, a memory 26, the CPU 27, the AF processing circuit 28 and an operation section 29.

The image pickup device 21 is disposed on the optical axis of the taking lens 11 in the lens unit 10 and near the image-forming position of a subject. In other words, a light beam passes through the taking lens 11 and the aperture (not shown) and its image is formed on the imaging plane of the image pickup device 21.

The image pickup device 21 includes a plurality of pixels, each pixel having a photoelectric converter to convert a subject image (optical image) into an electrical signal. These pixels are arranged two-dimensionally. The image pickup device 21 is configured as one that can be exposure-controlled by an electronic shutter (e.g. an electronic rolling shutter). As one example of the image pickup device, there is a CMOS sensor, a CCD sensor or the like. The electronic rolling shutter is a device which resets a plurality of pixels arranged two-dimensionally on the imaging plane of the image pickup device 21 or reads signals from the pixels time-sequentially for each of the pixels or time-sequentially for each line. In other words, the image pickup device 21 electronically controls signal storage time for each pixel or each line to make it possible to fulfill the same function as that of a mechanical shutter.

Furthermore, the image pickup device 21 includes focus detecting pixels (also referred to as phase difference AF detecting pixels) which are configured to limit the direction of incidence of light beams on the pixels as well as an imaging pixels configured to prevent light beams incident on the pixels from being limited more than the focus detecting pixels. In other words, the image pickup device 21 includes a phase difference detector 211 configured by the focus detecting pixels. The focus detecting pixels have only to employ an image pickup device that is disclosed in U.S. Pat. No. 9,088,710 to Okazawa et al., Jpn. Pat. Appln. KOKAI Publication No. 2012-150289 to Nishihara, and the like.

In response to a control signal from the CPU 27, the image pickup device controller 23 controls the charge storage of the image pickup device 21, the readout of an image pickup signal, and the like.

The image pickup signal processor 22 is configured to perform image processing. More specifically, the image pickup signal processor 22 receives an image pickup signal from the image pickup device 21 under the control of the image pickup device controller 23 and stores it temporarily in the memory 26. The image pickup signal processor 22 reads the image pickup signal out of the memory 26 and converts it into a video signal. The video signal is output to the display device 25 and its corresponding image is displayed thereon. Accordingly, a photographer can confirm a photographed image from the image displayed on the display device 25, or what is called a live view image. The image pickup signal processor 22 performs various types of image processing for the image pickup signal stored temporarily in the memory 26. Then, it converts the image pickup signal into JPEG data and stores the JPEG data in the storage medium 24. If the image pickup signal is a moving image, the image pickup signal processor 22 converts it into MPEG data or the like and stores it into the storage medium 24. The image pickup signal processor 22 has a function of extracting a focus detecting pixel signal from the phase difference detector 211, which is included in the image pickup signals output from the image pickup device 21, and inputting the focus detecting pixel signal to the AF processing circuit 28.

The memory 26 is provided as a storage area and includes, e.g. an SDRAM and a flash ROM. The SDRAM is a memory for storing an image pickup signal temporarily and used in, e.g. a work area to convert the image pickup signal. The flash ROM non-volatility stores control programs to be executed by the CPU 27 and data such as mode set values and control parameters to be referred to/rewritten during the execution of the control programs. The storage medium 24 is an external storage medium such as various types of memory card and an external hard disk drive (HDD), and is attached to the camera body 20 of the image acquisition apparatus 1 communicably and exchangeably.

Though not shown in particular, the operation section 29 is configured by a group of switches including operation buttons necessary for operating the image acquisition apparatus 1, such as a release switch to give an instruction to perform a taking operation, a mode selection switch to select a taking mode or an image display mode, and a power switch. The release switch is designed to perform a release button half-depression operation, namely a first release depression operation and a release button full-depression operation, namely a second release depression operation.

The AF processing circuit 28, which is one embodiment of the focus adjustment device of the present invention, performs an AF operation in response to a focus detecting pixel signal input from the image pickup signal processor 22. The AF processing circuit 28 includes a defocus amount calculation circuit 281, a target position setting circuit 282, a lens drive control circuit 283, a condition determination circuit 284 and a low-speed calculation circuit 285.

The defocus amount calculation circuit 281 makes a distance measurement based on the input focus detecting pixel signal, or a phase difference operation to calculate a defocus amount.

The target position setting circuit 282 calculates a focus lens driving target position OFδ in the taking lens 11 of the lens unit 10 from the defocus amount calculated by the defocus amount calculation circuit 281 and sets the calculated focus lens driving target position OFδ and a high driving speed or a low driving speed, which is the driving speed of the focus lens, as drive control information.

The lens drive control circuit 283 transmits the drive control information set by the target position setting circuit 282 to the lens CPU 13 of the lens unit 10 to move the focus lens in the direction of the optical axis.

The condition determination circuit 284 determines whether a deceleration condition or a stop condition has been satisfied based on the defocus amount calculated by the defocus amount calculation circuit 281. The deceleration condition is a condition for switching the driving of the focus lens from high-speed driving to low-speed driving, and the stop condition is a condition for switching the driving of the focus lens from low-speed driving to stopping, the details of which will be described later.

When the condition determination circuit 284 determines that the deceleration condition has been satisfied, the low-speed calculation circuit 285 calculates the speed of low-speed driving of the focus lens. After the condition determination circuit 284 determines that the deceleration condition has been satisfied, the target position setting circuit 282 sets the speed of low-speed driving calculated by the low-speed calculation circuit 285 to drive control information in place of the high driving speed set as an initial driving speed.

The low-speed calculation circuit 285 includes a provisional-speed calculation circuit 2851, a distance measuring number calculation circuit 2852 and a speed calculation circuit 2853.

The provisional-speed calculation circuit 2851 calculates a speed that can be maximized as the speed of low-speed driving, as a provisional speed. The speed that can be maximized as the speed of low-speed driving depends upon various conditions such as the type of the lens unit 10, the number of distance measuring points, and exposure time.

The distance measuring number calculation circuit 2852 calculates the number of times the defocus amount can be detected, based on the low speed set by the provisional-speed calculation circuit 2851 and the position of the focus lens when the low-speed driving is selected.

The speed calculation circuit 2853 calculates the speed of low-speed driving of the focus lens, based on the number of times calculated by the distance measuring number calculation circuit 2852 and the position of the focus lens when the low-speed driving is selected.

The operations of the provisional-speed calculation circuit 2851, distance measuring number calculation circuit 2852 and speed calculation circuit 2853 will be described in detail later.

Figure 2A:
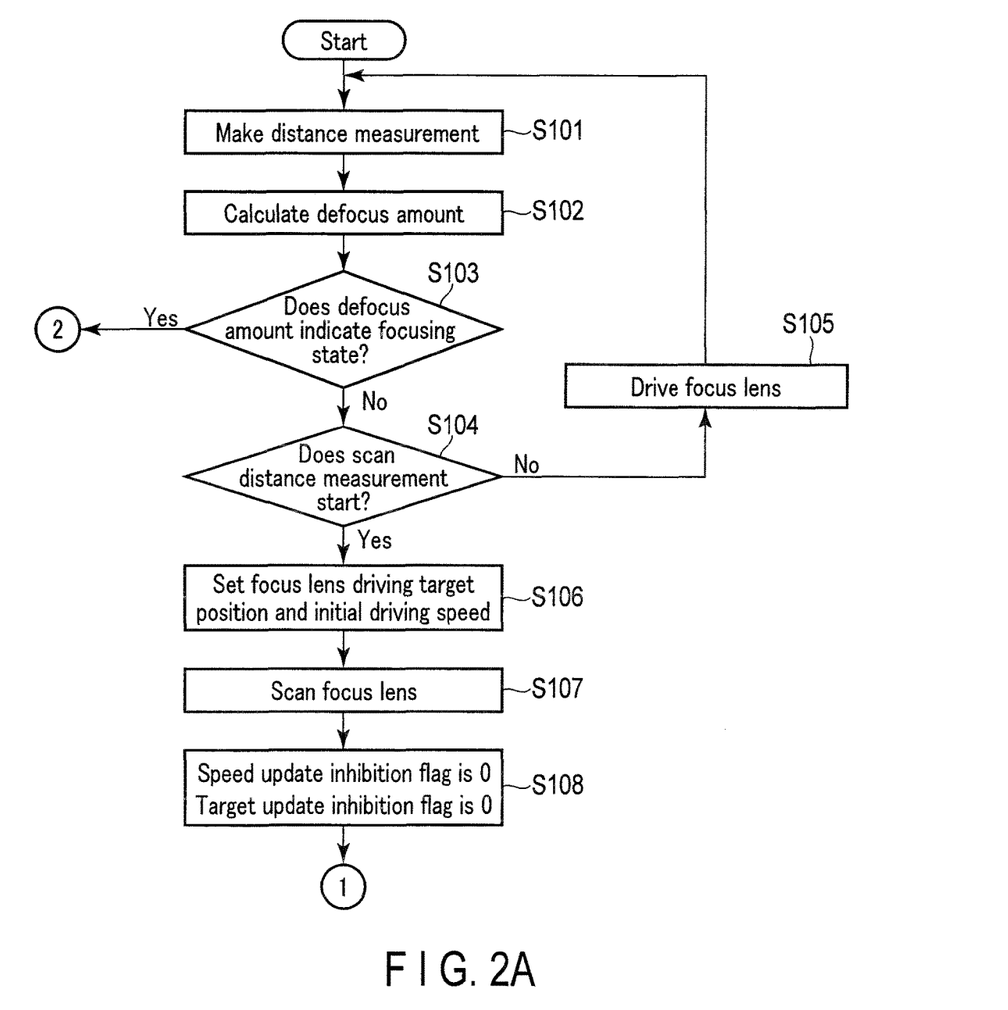
FIG. 2A is a first part of the flowchart for describing an AF operation of the image acquisition apparatus.
Figure 2B:
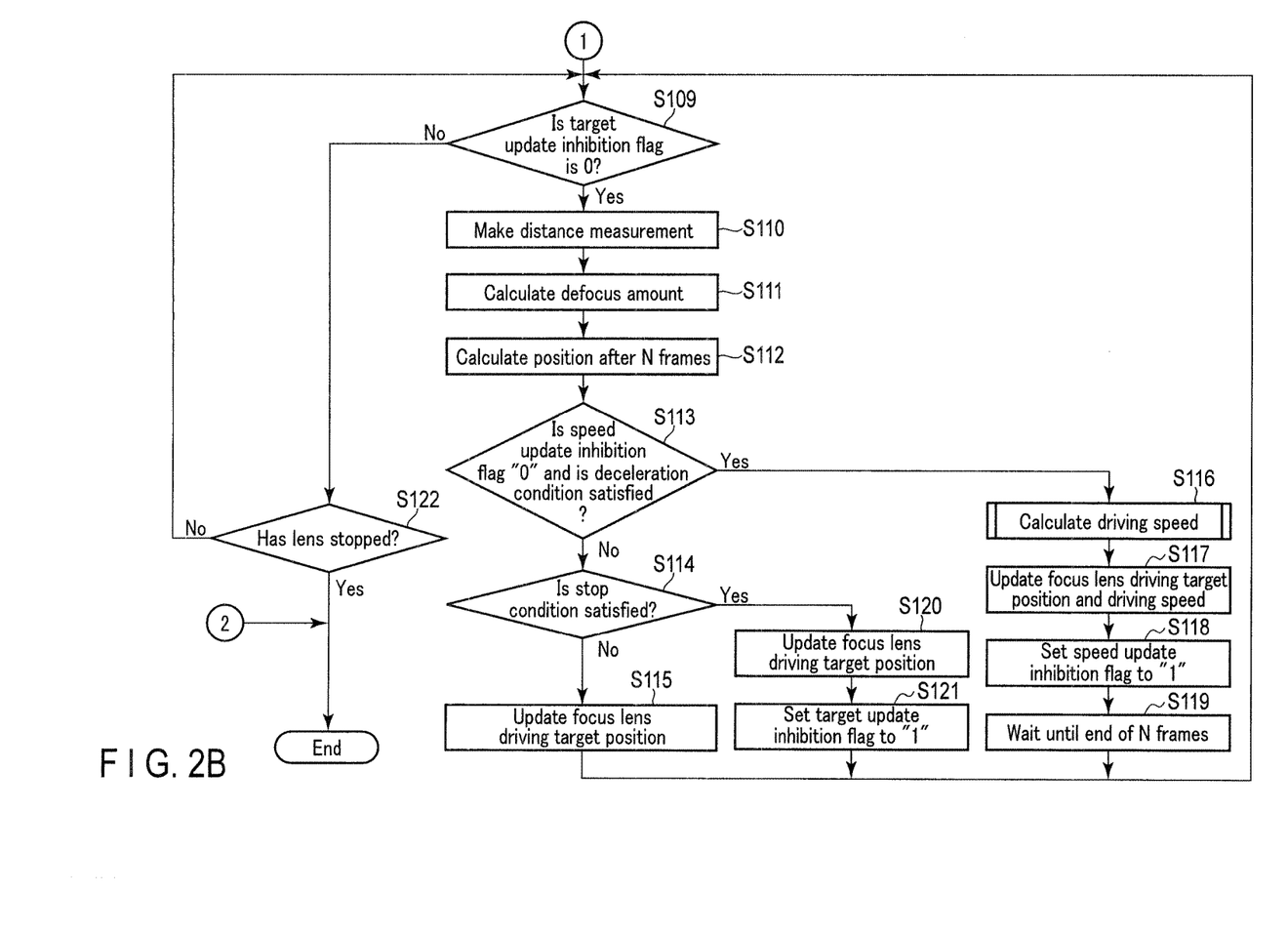
FIG. 2B is a second part of the flowchart for describing the AF operation of the image acquisition apparatus.

The AF operation of the image acquisition apparatus 1 configured as described above will be described in detail with reference to the flowchart shown in FIGS. 2A and 2B. The AF operation is performed by the AF processing circuit 28 in response to an AF operation instruction from the CPU 27 when a photographer depresses the release switch in the operation section 29 halfway, or when a first release is input by the first release depression operation. The CPU 27 determines periodically (e.g. for each frame rate of imaging) whether the first release is input or not. The CPU 27 also communications with the lens CPU 13 periodically to acquire various information items, such as lens type information of the type of the focus lens, the f-number, etc. and the current lens position information and then store them in the memory 26.

In the AF operation, first, the AF processing circuit 28 makes a distance measurement based on the focus detecting pixel signal input from the image pickup signal processor 22 by the defocus amount calculation circuit 281, namely a phase difference operation (step S101). Then, the AF processing circuit 28 calculates a defocus amount based on a result of the operation (step S102).

After that, the AF processing circuit 28 determines whether the defocus amount calculated in step S102 indicates a focusing state (step S103). The defocus amount can be represented as $F\delta$ where the f-number is F and the permissible circle of confusion is $\delta$. The AF processing circuit 28 determines whether the defocus amount indicates the focusing state according to whether the defocus amount falls within the allowable depth, namely within $\pm 1$ $F\delta$.

When the AF processing circuit 28 determines in step S103 that the defocus amount indicates the focusing state, it ends the AF operation.

In contrast, when the AF processing circuit 28 determines in step S103 that the defocus amount does not indicate the focusing state, it determines whether to start a scan distance measurement (step S104). The AF processing circuit 28 determines whether to start a scan distance measurement according to whether the defocus amount calculated in step S102 falls within a fixed range.

When the AF processing circuit 28 determines in step S104 that the defocus amount falls within the fixed range, it drives the focus lens in the taking lens 11 of the lens unit 10 by an amount of drive corresponding to the defocus amount calculated in step S102 (step S105). More specifically, the target position setting circuit 282 calculates a focus lens driving target position $OF\delta$ from the defocus amount and sets drive control information. The lens drive control circuit 283 transmits the set drive control information to the lens CPU 13 of the lens unit 10. Accordingly, the focus lens moves in a direction in which the defocus amount becomes zero. After that, the AF processing circuit 28 repeats the operations of steps S101 to S104.

In contrast, when the AF processing circuit 28 determines in step S104 that the defocus amount does not fall within the fixed range, namely the defocus amount is not smaller than a fixed amount, it makes a scan distance measurement. The scan distance measurement is a calculation of a defocus amount with the focus lens driven.

In the scan distance measurement, first, the AF processing circuit 28 calculates a focus lens driving target position $OF\delta$ from the defocus amount calculated in step S102 and sets the focus lens driving target position $OF\delta$ and the initial driving speed $V_{1st}$ of the focus lens as drive control information (step S106). The initial driving speed $V_{1st}$ can be preset. The speed based on lens information stored in the memory 26 can be set as the initial driving speed $V_{1st}$.

Then, the AF processing circuit 28 supplies the lens CPU 13 with the drive control information (focus lens driving target position $OF\delta$ and initial driving speed $V_{1st}$) set in step S106 by the lens drive control circuit 283. Accordingly, a scan that the focus lens is driven at high speed in a direction in which the defocus amount becomes zero is started (step S107).

The AF processing circuit 28 initializes each of the speed update inhibition flag and target update inhibition flag, which are stored in the internal memory (not shown) or the memory 26, to "0" (step S108). The speed update inhibition flag indicates whether a speed update is permitted or inhibited. The speed update inhibition flag indicates that the speed update is permitted when it is "0" and it indicates that the speed update is inhibited when it is "1." Similarly, the target update inhibition flag indicates whether a focus lens driving target position $OF\delta$ update is permitted or inhibited. The target update inhibition flag indicates that the target position update is permitted when it is "0" and it indicates that the target position update is inhibited when it is "1."

After that, the condition determination circuit 284 in the AF processing circuit 28 determines whether the target update inhibition flag is "0" (step S109). Since the target update inhibition flag is initialized to "0" in step S108, the condition determination circuit 284 determines that the target update inhibition flag is "0" or it indicates that the target position update is permitted. In this case, as in steps S101 and S102, the defocus amount calculation circuit 281 in the AF processing circuit 28 makes a distance measurement (step S110) to calculate a defocus amount (step S111). After that, the condition determination circuit 284 determines whether a deceleration condition or a stop condition has been satisfied based on the defocus amount calculated in step S111.

Figure 3:
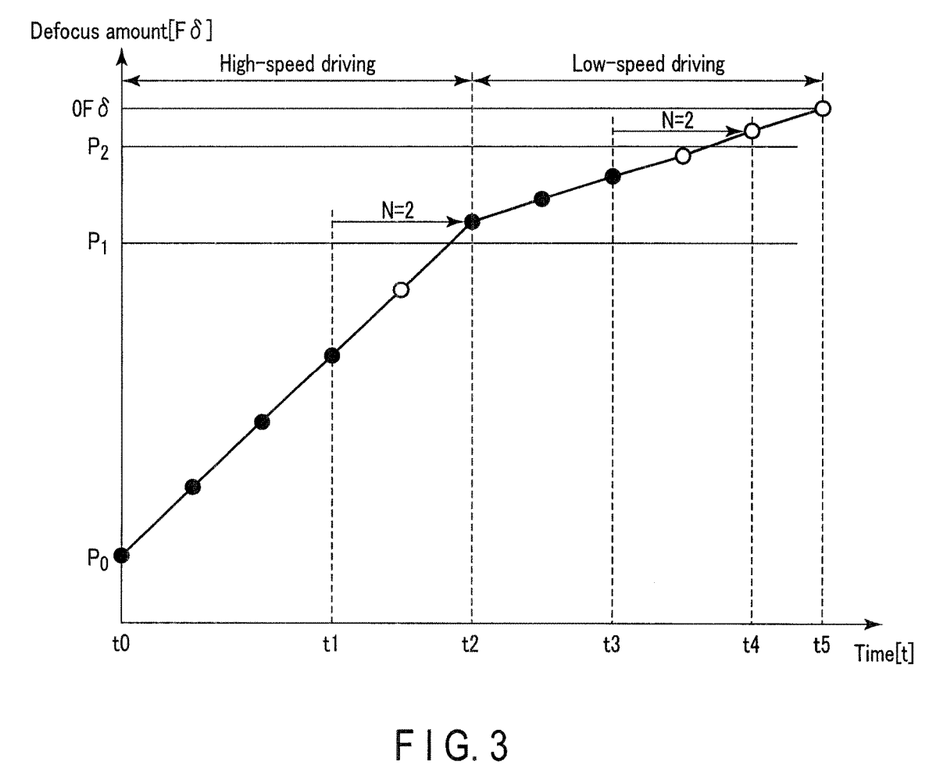
FIG. 3 is a graph for describing a change from high-speed driving to low-speed driving in the AF operation.

FIG. 3 is a graph for describing a timing of a change from high-speed driving to low-speed driving in the AF operation. The graph shows variations in defocus amount over time where the vertical axis indicates a defocus amount [Fδ] and the horizontal axis indicates time [t]. In the graph, the filled circles represent a case of distance measurement and the open circles represent a case where the update of the focus lens driving target position OFδ or the update of the speed is not performed.

When the focus lens is in start position $P_0$ at time t0, the AF processing circuit 28 first makes a distance measurement in step S101 and calculates a defocus amount in step S102. Then, the AF processing circuit 28 calculates a focus lens driving target position OFδ from the calculated defocus amount in step S106 and starts to drive the focus lens at high speed in step S107. After that, the AF processing circuit 28 makes the distance measurement of step S101, e.g. for each frame rate of imaging with fixed timing to update the driving target position OFδ of the focus lens of the lens unit 10 to be driven.

The focus lens driving target position OFδ cannot be updated immediately because it is necessary to carry out communications with the lens unit 10. A time lag is caused from when the lens drive control circuit 283 of the AF processing circuit 28 transmits a new focus lens driving target position OFδ to the lens CPU 13 of the lens unit 10 until the lens CPU 13 receives the new focus lens driving target position OFδ to start to drive the focus lens in the position. In this embodiment, therefore, a focus lens position after N frames in which the focus lens driving target position OFδ (and the driving speed) is updated, is predicted. The N depends upon, for example, the type of the lens unit 10 acquired from the lens CPU 13, the number of distance measurement points and an index indicating the speed of communication processing of the lens unit 10. In FIG. 3, N is equal to 2.

If the AF processing circuit 28 has made a distance measurement in step S110 and calculated a defocus amount in step S111, the condition determination circuit 284 first predicts a defocus amount corresponding to the focus lens position after N frames (step S112). Then, the condition determination circuit 284 determines whether the speed update inhibition flag is "0" and the deceleration condition is satisfied (step S113).

The deceleration condition is a condition for switching the driving of the focus lens from high-speed driving to low-speed driving. More specifically, the deceleration condition is a condition fixed as a design value of the image acquisition apparatus 1 or an adaptive condition based upon the type of the lens unit 10, information acquired from the lens CPU 13 and the like. As shown in FIG. 3, the deceleration condition is set as a low-speed selecting position $P_1$ corresponding to the lower or upper limit position in the range of the defocus amount in which a focusing nearby point can be detected. Whether the deceleration condition in step S113 is satisfied therefore means whether the absolute value of a defocus amount corresponding to the focus lens position after N frames calculated in step S112 is smaller than a defocus amount indicating the low-speed selecting position $P_1$.

When the focus lens is in start position $P_0$ at time t0, the condition determination circuit 284 determines that the speed update inhibition flag is "0" or indicates that the speed update is permitted because it is initialized to "0" in step S108. However, the condition determination circuit 284 determines that the deceleration condition is not satisfied because the absolute value of a defocus amount corresponding to the focus lens position after N frames is larger than the defocus amount indicating the low-speed selecting position $P_1$. Thus, when the focus lens is in start position $P_0$ at time t0, the condition determination circuit 284 determines that the speed update inhibition flag is "0" and the deceleration condition is not satisfied.

In the above case, the condition determination circuit 284 determines whether the stop condition is satisfied (step S114).

The stop condition is a condition for switching the driving of the focus lens from low-speed driving to stopping. More specifically, the stop condition is a condition fixed as a design value of the image acquisition apparatus 1 or an adaptive condition based upon the type of the lens unit 10, information acquired from the lens CPU 13 and the like. As shown in FIG. 3, the stop condition is set as a stop control position $P_2$ corresponding to the lower limit or upper limit position in the range of the defocus amount in which the focus lens is controlled to stop in the focus lens driving target position OFδ. Whether the stop condition in step S114 is satisfied therefore means whether the absolute value of a defocus amount corresponding to the focus lens position after N frames calculated in step S112 is smaller than a defocus amount indicating the stop control position $P_2$.

When the focus lens is in start position $P_0$ at time t0, the condition determination circuit 284 determines that the stop condition that the absolute value of a defocus amount corresponding to the focus lens position after N frames is smaller than a defocus amount indicating the stop control position $P_2$ is not satisfied. In this case, the AF processing circuit 28 updates the focus lens driving target position OFδ (step S115). In other words, the target position setting circuit 282 of the AF processing circuit 28 calculates a focus lens driving target position OFδ again from the defocus amount calculated in step S111 and sets it as drive control information. As the driving speed of the focus lens, the initial driving speed $V_{1st}$ of the high driving speed is set. The lens drive control circuit 283 of the AF processing circuit 28 transmits the drive control information to the lens CPU 13. After that, the AF processing circuit 28 returns its operation to step S109.

As described above, the distance measurement is continuously made with fixed timing to update the focus lens driving target position OFδ until the condition determination circuit 284 determines that the speed update inhibition flag is "0" and the deceleration condition is satisfied.

In step S113, at time t1, the condition determination circuit 284 determines that the speed update inhibition flag is "0" and the deceleration condition is satisfied. In the example shown in FIG. 3, in step S112, the condition determination circuit 284 predicts a defocus amount corresponding to the focus lens position after N (=2) frames from the defocus amount calculated by making a distance measurement at time t1. If a defocus amount is calculated by making a distance measurement at time t1, the absolute value of a defocus amount corresponding to the focus lens position after N frames becomes smaller than a defocus amount indicating the low-speed selecting position $P_1$, as shown in FIG. 3.

If it is detected that the focus lens position after N frames falls within a low-speed selection range in which a focusing nearby point can be detected as described above, a low driving speed is selected as the driving speed of the focus lens.

The low-speed calculation circuit 285 of the AF processing circuit 28 calculates the selected low driving speed $V_{2nd}$ of the focus lens (step S116). Then, the AF processing circuit 28 updates the focus lens driving target position OFδ and the driving speed of the focus lens (step S117). In other words, the target position setting circuit 282 calculates a focus lens driving target position OFδ again from the defocus amount calculated in step S111 and sets the focus lens driving target position OFδ and the low driving speed $V_{2nd}$ calculated in step S116 as drive control information. Then, the lens drive control circuit 283 of the AF processing circuit 28 sends the drive control information to the lens CPU 13. Thus, the driving speed is decelerated from the initial driving speed $V_{1st}$ of the high driving speed to the low driving speed $V_{2nd}$. As described above, however, it is time t2 after N frames when the focus lens driving target position OFδ and the driving speed are updated.

After the AF processing circuit 28 updates the focus lens driving target position OFδ and the driving speed of the focus lens, it sets the speed update inhibition flag to "1" (step S118). In other words, the AF processing circuit 28 does not update the driving speed in the subsequent steps. Then, the AF processing circuit 28 waits until the end of the N frames (step S119) and returns its operation to step S109. As shown in FIG. 3, therefore, the AF processing circuit 28 does not update the driving speed between time t1 and time t2. At that time, the AF processing circuit 28 can make a distance measurement and update the focus lens driving target position OFδ.

Since the speed update inhibition flag is set to "1" in step S118 at time t2, the condition determination circuit 284 determines that the speed update inhibition flag is not "0" and the deceleration condition is satisfied in step S113. In this case, therefore, the AF processing circuit 28 moves its operation to step S114 to determine whether the stop condition is satisfied.

In the focus lens position at time t2, the condition determination circuit 284 determines that the stop condition is not satisfied. The AF processing circuit 28 moves its operation to step S115 to update the focus lens driving target position OFδ. After that, the AF processing circuit 28 returns the operation to step S109.

Thus, the AF processing circuit 28 makes a distance measurement with fixed timing to update the focus lens driving target position OFδ until the condition determination circuit 284 determines that the stop condition is satisfied.

At time t3, the condition determination circuit 284 determines that the stop condition is satisfied in step S114. In the example shown in FIG. 3, in step S112, the condition determination circuit 284 predicts a defocus amount corresponding to the focus lens position after N (=2) frames from the defocus amount calculated by making a distance measurement at time t3. If a defocus amount is calculated by making a distance measurement at time t3, the absolute value of a defocus amount corresponding to the focus lens position after N frames becomes smaller than a defocus amount indicating the stop control position $P_2$, as shown in FIG. 3.

If the AF processing circuit 28 detects that the focus lens position after N frames falls within a range in which the focus lens can be controlled to stop before the focus lens driving target position OFδ, it finally updates the focus lens driving target position OFδ (step S120). More specifically, the target position setting circuit 282 calculates a focus lens driving target position OFδ again from the defocus amount calculated in step S111 and sets it as drive control information. As the driving speed of the focus lens, the low driving speed $V_{2nd}$ is set. The lens drive control circuit 283 transmits the drive control information to the lens CPU 13. As described above, however, it is time t4 after N frames when the focus lens driving target position OFδ is updated.

After the AF processing circuit 28 finally updates the focus lens driving target position OFδ, it sets the target update inhibition flag to "1" (step S121). In other words, the AF processing circuit 28 updates neither the driving speed nor the target in the subsequent steps. As shown in FIG. 3, therefore, the AF processing circuit 28 updates neither the driving speed nor the focus lens driving target position OFδ after time t3. At that time, the AF processing circuit 28 can make a distance measurement. Then, the AF processing circuit 28 returns its operation to step S109.

Since the target update inhibition flag is set to "1" in step S121, the condition determination circuit 284 determines that the target update inhibition flag is not "0," namely it indicates a target position update inhibition state. In this case, the AF processing circuit 28 determines whether it has received from the lens CPU 13 a lens stop signal indicating that the focus lens has stopped in the final focus lens target position OFδ that is finally updated in step S120 (step S122). When the AF processing circuit 28 determines that it has not yet received a lens stop signal, it returns its operation to step S109. Thus, the AF processing circuit 28 waits for the focus lens to stop. If the AF processing circuit 28 determines in step S122 that it has received the lens stop signal, it ends the AF operation.

In FIG. 3, the focus lens stops in the final focus lens target position OFδ at time t5. Though a time lag is caused in the communications between the lens unit 10 and the AF processing circuit 28 as described above, it has no influence on the AF operation because the AF processing circuit 28 performs no operation of updating the focus lens target position OFδ or the driving speed.

Though not shown in particular, after the AF operation is performed, the CPU 27 causes the image pickup device 21 to perform an exposure operation through the image pickup device controller 23 in response to the second release depression of the release switch full-depression operation.

The stop control position $P_2$ shown in FIG. 3 corresponds to the lower limit position in the range necessary for stopping the focus lens in the focus lens target position OFδ. It is necessary to detect a defocus amount with high precision at time t3 to determine that the stop condition is satisfied because the stop control position $P_2$ is the final update position of the focus lens target position OFδ. To complete the AF operation at high speed, the number of distance measurements for detecting a defocus amount with high precision needs to be minimized and thus the low driving speed $V_{2nd}$ of the focus lens becomes important. Below is a description of calculating the low driving speed $V_{2nd}$.

Figure 4:
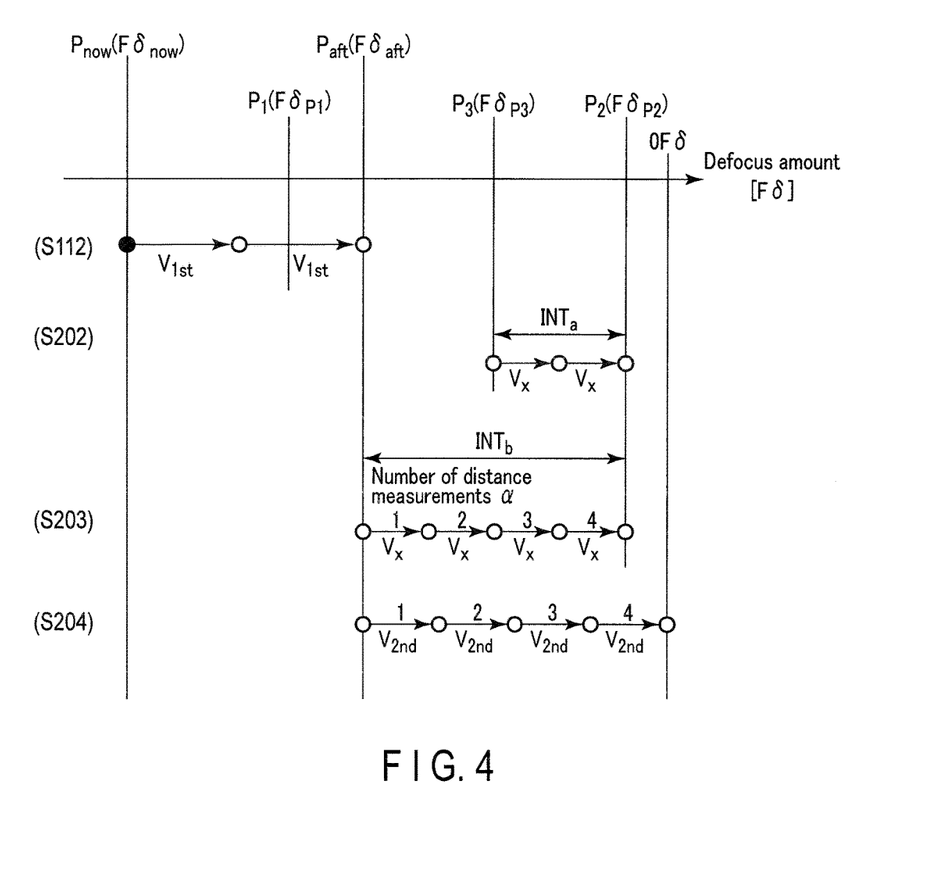
FIG. 4 is a chart schematically showing how to calculate the driving speed in the low-speed driving.

FIG. 4 is a chart schematically showing how to calculate the low driving speed $V_{2nd}$. At time t1 in FIG. 3, the condition determination circuit 284 of the AF processing circuit 28 predicts a defocus amount $F\delta_{aft}$ [$F\delta$] corresponding to the focus lens position $P_{aft}$ after N (=2) frames from the current distance measurement position $P_{now}$ by the following equation (1) in step S112.

$$F\delta_{aft} = F\delta_{now} - V_{1st} \times N \tag{1}$$

where $F\delta_{now}$ is the absolute value [$F\delta$] of the defocus amount calculated with respect to the current distance measurement position $P_{now}$ in step S111 and the initial driving speed $V_{1st}$ is the high driving speed [$F\delta$/frame] before deceleration. As has been described with reference to FIG. 3, the speed of the focus lens is switched to the low driving speed $V_{2nd}$ when it is detected that the defocus amount $F\delta_{aft}$ falls within the range between the lower and upper limit values. The low driving speed $V_{2nd}$ is reflected from the focus lens position $P_{aft}$ after N frames from the current distance measurement position $P_{now}$.

The low driving speed $V_{2nd}$ is calculated by the speed calculation operation of step S116.

Figure 5:
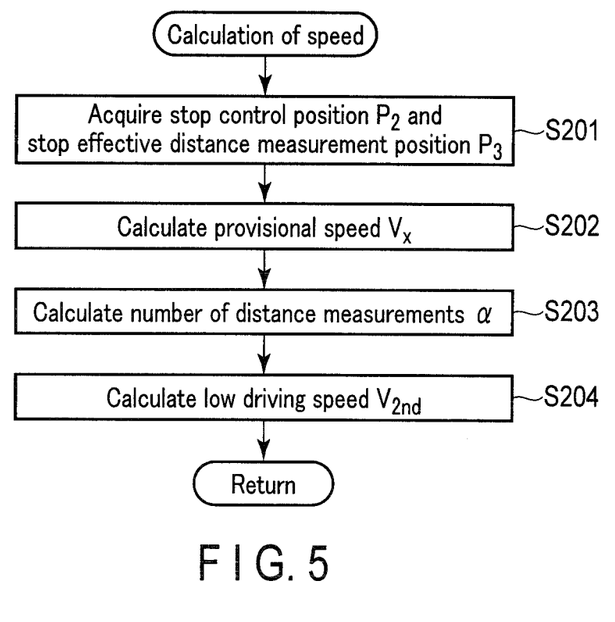
FIG. 5 is a flowchart for describing a speed calculation operation in FIG. 2B.

More specifically, as shown in FIG. 5, the provisional-speed calculation circuit 2851 of the low-speed calculation circuit 285 in the AF processing circuit 28 first acquires a defocus amount $F\delta_{P2}$ corresponding to the stop control position $P_2$ and a defocus amount $F\delta_{P3}$ corresponding to a stop effective distance measurement position $P_3$ (step S201). The stop effective distance measurement position $P_3$ is the upper limit position in a range capable of detecting a high-precision defocus amount, or an effective defocus amount. If at least one distance measurement is made within this range, the precision of the focus lens driving target position $OF\delta$ in the final update of the focus lens position is secured. The stop control position $P_2$ and the stop effective distance measurement position $P_3$ are values that vary with the conditions, such as the type of the lens unit 10, the number of distance measuring points (one point/multipoint distance measurement), and exposure time. Thus, the provisional-speed calculation circuit 2851 acquires the defocus amounts $F\delta_{P2}$ and $F\delta_{P3}$ corresponding to the stop control position $P_2$ and stop effective distance measurement position $P_3$ by communicating with the lens CPU 13. The provisional-speed calculation circuit 2851 may acquire the defocus amounts $F\delta_{P2}$ and $F\delta_{P3}$ by reading out from the memory 26 in which stores the defocus amounts $F\delta_{P2}$ and $F\delta_{P3}$ by communicating with the lens CPU 13 in advance.

After that, the provisional-speed calculation circuit 2851 calculates the maximum speed after the stop effective distance measurement position $P_3$ from the acquired defocus amounts $F\delta_{P2}$ and $F\delta_{P3}$ as a provisional speed $V_x$ [$F\delta$/frame] (step S202). This provisional speed $V_x$ is calculated by the following equation (2).

$$V_x = (F\delta_{P3} - F\delta_{P2})/N \tag{2}$$

where $(F\delta_{P3} - F\delta_{P2})$ is a defocus amount corresponding to A section $INT_a$ between the stop effective distance measurement position $P_3$ and the stop control position $P_2$. The provisional speed $V_x$ so calculated becomes the maximum speed at which the position of the focus lens after N frames from the stop effective distance measurement position $P_3$ does not exceed the stop control position $P_2$. In other words, at the maximum speed, the A section $INT_a$ is divided into N frames.

The provisional-speed calculation circuit 2851 communicates with the lens CPU 13 to acquire the defocus amounts $F\delta_{P2}$ and $F\delta_{P3}$ corresponding to the stop control position $P_2$ and stop effective distance measurement position $P_3$. The stop control position $P_2$ and stop effective distance measurement position $P_3$ and the conversion coefficient (e.g. focus sensitivity) for converting the moving amount of the focus lens into a defocus amount can be acquired through communications. In this case, the provisional-speed calculation circuit 2851 calculates the defocus amounts $F\delta_{P2}$ and $F\delta_{P3}$ corresponding to the stop control position $P_2$ and stop effective distance measurement position $P_3$ based upon the stop control position $P_2$ and the stop effective distance measurement position $P_3$ and the conversion coefficient.

The distance measuring number calculation circuit 2852 of the low-speed calculation circuit 285 calculates the number of distance measurements $\alpha$ using the calculated provisional speed $V_x$ and the defocus amount $F\delta_{aft}$ corresponding to the focus lens position $P_{aft}$ after N frames calculated in step S112 (step S203). The number of distance measurements $\alpha$ is calculated by the following equation (3).

$$\alpha = (F\delta_{aft} - F\delta_{P2})/V_x \tag{3}$$

where $(F\delta_{aft} - F\delta_{P2})$ is a defocus amount corresponding to B section $INT_b$ between the focus lens position $P_{aft}$ after N (=2) frames from the current distance measurement position $P_{now}$ and the stop control position $P_2$. The number of distance measurements $\alpha$ so calculated corresponds to the number of distance measurements obtained when the focus lens is driven at speed $V_x$ in the B section $INT_b$.

The speed calculation circuit 2853 of the low-speed calculation circuit 285 calculates the low driving speed $V_{2nd}$ [$F\delta$/frame] using the calculated number of distance measurements $\alpha$ and the defocus amount $F\delta_{aft}$ corresponding to the focus lens position $P_{aft}$ after N frames calculated in step S112 (step S204). The low driving speed $V_{2nd}$ is calculated by the following equation (4).

$$V_{2nd} = (F\delta_{aft} - OF\delta)/\alpha \tag{4}$$

where $(F\delta_{aft} - OF\delta)$ is a defocus amount obtained when the focus lens moves to the focus lens driving target position $OF\delta$ from the focus lens position $P_{aft}$ after N (=2) frames from the current distance measurement position $P_{now}$.

Thus, the number of distance measurements $\alpha$ in the B section $INT_b$ between the focus lens position $P_{aft}$ after N frames, which is a deceleration start position, and the stop control position $P_2$ is obtained from the provisional speed $V_x$ that is the maximum speed in the A section $INT_a$ between the stop effective distance measurement position $P_3$ in which a high-precision defocus amount can be obtained and the stop control position $P_2$. Accordingly, the low driving speed $V_{2nd}$ can be obtained in which a defocus amount can be calculated at least one time within a range capable of making a high-precision distance measurement. In other words, a high-speed, high-quality AF operation can be achieved by calculating the low driving speed $V_{2nd}$ at which a high-precision distance measurement result can be obtained without lowering the speed of the focus lens too much and causing the focus lens to overrun the focus lens driving target position $OF\delta$ that is a focusing position.

As described above, the AF processing circuit 28 serving as the focus adjustment device according to the embodiment includes the defocus amount calculation circuit 281, target position setting circuit 282, lens drive control circuit 283, condition determination circuit 284 and low-speed calculation circuit 285. The defocus amount calculation circuit 281 functions as a focus detector that calculates a defocus amount of the taking lens 11 serving as an imaging optical system including a focus lens by phase difference detection. The target position setting circuit 282, lens drive control circuit 283, condition determination circuit 284 and low-speed calculation circuit 285 function as a controller that moves the focus lens to the focus lens driving target position OFδ that is a target position, to adjust a focus of the focus lens based on the defocus amount output from the defocus amount calculation circuit 281. While the controller is moving the focus lens to the focus lens driving target position OFδ, it switches the moving speed from the initial driving speed $V_{1st}$ that is a first speed to the low driving speed $V_{2nd}$ of a lower second speed. When the focus lens moves at the provisional speed $V_x$ that is a predetermined speed in the B section $INT_b$ between a first position in which the switching is performed, e.g. the position $P_{aft}$ and the stop control position $P_2$ that is a second position in which the focus lens starts being controlled to stop in the focus lens driving target position OFδ, the defocus amount calculation circuit 281 of the controller calculates the number of distance measurements α that allows the defocus amount to be calculated. Then, the controller calculates the low driving speed $V_{2nd}$ based on the number of distance measurements α, the first position and the focus lens driving target position OFδ. Thus, the AF processing circuit 28 calculates the number of distance measurements α in the B section $INT_b$ between the first position, which is a deceleration start position, and the stop control position $P_2$ from the provisional speed $V_x$ that is the maximum speed in the A section $INT_a$ between the stop effective distance measurement position $P_3$ in which a high-precision defocus amount can be obtained and the stop control position $P_2$. It is thus possible to obtain the low driving speed $V_{2nd}$ at which a defocus amount can be calculated at least one time within a range capable of making a high-precision distance measurement. In other words, a high-speed AF operation can be achieved by calculating the low driving speed $V_{2nd}$ at which a high-precision distance measurement result can be obtained without lowering the speed of the focus lens too much and causing the focus lens to overrun the focus lens driving target position OFδ that is a focusing position.

In particular, the controller calculates a defocus amount $F\delta_{aft}$ corresponding to the first position, e.g. the position $P_{aft}$ on the basis of the defocus amount output from the defocus amount calculation circuit 281. Then, the controller calculates the number of distance measurements α using the calculated defocus amount $F\delta_{aft}$ and a predetermined defocus amounts $F\delta_{P2}$ corresponding to the stop control position $P_2$. The number of distance measurements α can thus be obtained using the defocus amounts $F\delta_{aft}$ and $F\delta_2$ without acquiring the position of the focus lens from the lens unit 10.

The low driving speed $V_{2nd}$ is a speed at which the defocus amount calculation circuit 281 can calculate a defocus amount a predetermined number of times in the A section $INT_a$ between the stop effective distance measurement position $P_3$ that is a third position in which the defocus amount calculation circuit 281 can acquire an effective defocus amount and the stop control position $P_2$. The low driving speed $V_{2nd}$ allows the focus lens to stop without lowering the speed of the focus lens too much and causing the focus lens to overrun the focus lens driving target position OFδ.

The defocus amount calculation circuit 281 repeats calculating the defocus amount with fixed timing, e.g. for each frame rate of imaging of the image pickup device 21. The first position, e.g. the position $P_{aft}$ is a position corresponding to time when the focus lens moves at the initial driving speed $V_{1st}$ from the current distance measurement position $P_{now}$, at which the defocus amount calculation circuit 281 calculates the defocus amount, to the focus lens driving target position OFδ and the defocus amount calculation circuit 281 calculates the defocus amount a predetermined number of times, namely time required for imaging of N frames. The determination to switch the driving of the focus lens from the initial driving speed $V_{1st}$ of the high driving speed to the low driving speed $V_{2nd}$ is made using not the current defocus amount $F\delta_{now}$ but the defocus amount $F\delta_{aft}$ after N frames. A high-speed, high-quality AF operation can thus be achieved by calculating the low driving speed $V_{2nd}$ at which a high-precision distance measurement result can be obtained without causing the focus lens to overrun the focus lens driving target position OFδ that is a focusing position before the driving speed is switched to the low speed. In other words, if the focus lens overruns, a low-quality image that is focused and then blurred will be presented as a live view image. According to the present embodiment, however, since the focus lens does not overrun, a high-quality live view image can be presented.

The provisional speed $V_x$ of the predetermined speed is a speed based on the predetermined defocus amount $F\delta_{P2}$ corresponding to the stop control position $P_2$, the predetermined defocus amount $F\delta_{P3}$ corresponding to the third position $P_3$ and the predetermined number of times. The defocus amounts $F\delta_{P2}$ and $F\delta_{P3}$ and the predetermined number of times depend upon the conditions such as the type of the lens unit 10 and are acquired by communicating with the lens unit 10. Thus, they need not be calculated but can be acquired at high speed.

The image pickup device 21 has a plurality of pixels each having a photoelectric converter to convert an optical image formed by the taking lens 11 into an electrical signal and includes the phase difference detector 211 that is focus detecting pixels configured to limit the direction of incidence of a light beam on the focus detecting pixel. The plurality of pixels are arranged two-dimensionally. The defocus amount calculation circuit 281 reads pixel signals from the phase difference detector 211 of the image pickup device 21 and calculates the defocus amount by the phase difference detection based on the pixel signals from the phase difference detector 211. The AF processing circuit 28 of the focus adjustment device according to the embodiment can thus be applied to the image acquisition apparatus 1 with the image pickup device 21 including the phase difference detector 211.

The focusing method according to one embodiment is executed by calculating a defocus amount of the taking lens 11 serving as an imaging optical system including a focus lens by phase difference detection and moving the focus lens to the focus lens driving target position OFδ that is a target position based on the calculated defocus amount to adjust a focus of the focus lens. In this method, while the focus lens is moving to the focus lens driving target position OFδ, the moving speed is switched from the initial driving speed $V_{1st}$ that is a first speed to the low driving speed $V_{2nd}$ of a lower second speed. In the focusing method according to one embodiment, when the focus lens moves at the provisional speed $V_x$ of the predetermined speed in the B section $INT_b$ between a first position in which the switching is performed, e.g. the position $P_{aft}$ and the stop control position $P_2$ that is a second position in which the focus lens starts being controlled to stop in the focus lens driving target position OFδ, the number of distance measurements α that allows the defocus amount to be calculated is calculated (step S203). Then, the low driving speed $V_{2nd}$ is calculated based upon the number of distance measurements α, the first position and the focus lens driving target position OFδ (step S204). Therefore, the low driving speed $V_{2nd}$ at which the defocus amount can be calculated at least one time, can be obtained within the range capable of a high-precision distance measurement by calculating the number of distance measurements α in the B section $INT_b$ between the first position, which is a deceleration start position, and the stop control position $P_2$ from the provisional speed $V_x$ of the maximum speed in the A section $INT_a$ between the stop effective distance measurement position $P_3$ in which a high-precision defocus amount is obtained and the stop control position $P_2$. In other words, a high-speed AF operation can be achieved by calculating the low driving speed $V_{2nd}$ at which a high-precision distance measurement result can be obtained without lowering the speed of the focus lens too much and causing the focus lens to overrun the focus lens driving target position OFδ that is a focusing position.

One embodiment of the present invention has been described so far. The present invention is not limited to the embodiment. Various modifications and applications can be made to the invention within the scope of the subject matter of the present invention.

For example, some or all of the functions of the AF processing circuit 28 serving as a focus adjustment device can be fulfilled by the CPU 27. In this case, a program code to perform the functions to be performed by the CPU 27 is stored in the memory 26 to which the CPU 27 can gain access.

The image pickup device 21 includes the phase difference detector 211 configured by focus detecting pixels. The phase difference detector 211 can be configured as a sensor separately from the image pickup device 21 and the AF processing circuit 28 can be configured to detect a phase difference in response to a signal from the sensor.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A focus adjustment device comprising:
    a focus detector which repeatedly calculates a defocus amount of an imaging optical system including a focus lens by phase difference detection; and
    a controller which moves the focus lens to a focus lens driving target position in which a defocus amount is 0 to adjust a focus of the focus lens based on the defocus amount output from the focus detector,
    wherein the controller
        switches a moving speed of the focus lens from a first speed to a second speed, while the focus lens is moving to the focus lens driving target position,
        calculates a number of times the focus detector is to calculate the defocus amount when the focus lens moves at a predetermined speed in a section between a defocus amount corresponding to a first position in which the moving speed is switched and a defocus amount corresponding to a second position in which the focus lens starts being controlled to stop in the focus lens driving target position,
        calculates the second speed based on the number of times, the defocus amount corresponding to the first position and the focus lens driving target position, and
        calculates the defocus amount corresponding to the first position based on the defocus amount output from the focus detector and the first speed, and
    wherein the predetermined speed is the speed at which the focus detector is to calculate the defocus amount a predetermined number of times in a section between the defocus amount corresponding to the second position and a defocus amount corresponding to a third position which is nearest to the focus lens driving target position and in which the focus detector is to acquire an effective defocus amount.

2. The device according to claim 1, wherein:
the focus detector reads pixel signals of focus detecting pixels from an image pickup device which includes a plurality of pixels each having a photoelectric converter to convert an optical image formed by the imaging optical system into an electrical signal, the plurality of pixels including the focus detecting pixels configured to limit a direction of incidence of a light beam on the focus detecting pixel and being arranged two-dimensionally; and
the focus detector calculates the defocus amount by the phase difference detection based on the pixel signals of the focus detecting pixels.

3. The device according to claim 1, wherein
the controller calculates the number of times using the calculated defocus amount corresponding to the first position and the defocus amount corresponding to the second position.

4. The device according to claim 3, wherein:
the focus detector repeats calculating the defocus amount with fixed timing; and
the first position is a position corresponding to time when the focus lens moves at the first speed from a position in which the focus detector calculates the defocus amount to the focus lens driving target position and the focus detector calculates the defocus amount the predetermined number of times.

5. The device according to claim 4, wherein:
the focus detector reads pixel signals of focus detecting pixels from an image pickup device which includes a plurality of pixels each having a photoelectric converter to convert an optical image formed by the imaging optical system into an electrical signal, the plurality of pixels including the focus detecting pixels configured to limit a direction of incidence of a light beam on the focus detecting pixel and being arranged two-dimensionally; and
the focus detector calculates the defocus amount by the phase difference detection based on the pixel signals of the focus detecting pixels.

6. The device according to claim 4, wherein
the predetermined speed is based on the defocus amount corresponding to the second position, the defocus amount corresponding to the third position, and the predetermined number of times.

7. The device according to claim 6, wherein:
the focus detector reads pixel signals of focus detecting pixels from an image pickup device which includes a plurality of pixels each having a photoelectric converter to convert an optical image formed by the imaging optical system into an electrical signal, the plurality of pixels including the focus detecting pixels configured to limit a direction of incidence of a light beam on the focus detecting pixel and being arranged two-dimensionally; and
the focus detector calculates the defocus amount by the phase difference detection based on the pixel signals of the focus detecting pixels.

8. A focus adjustment method for repeatedly calculating a defocus amount of an imaging optical system including a focus lens by phase difference detection and moving the focus lens to a focus lens driving target position in which the defocus amount is 0, based on the calculated defocus amount, to adjust a focus of the focus lens, the method comprising:

while the focus lens is moving to the focus lens driving target position, switching a moving speed of the focus lens from a first speed to a second speed, wherein the switching includes calculating a number of times the defocus amount is to be calculated when the focus lens moves at a predetermined speed in a section between a defocus amount corresponding to a first position in which the moving speed is switched and a defocus amount corresponding to a second position in which the focus lens starts being controlled to stop in the focus lens driving target position;

calculating the second speed based on the number of times, the defocus amount corresponding to the first position and the focus lens driving target position; and calculating the defocus amount corresponding to the first position based on the defocus amount output from the focus detector and the first speed, wherein the predetermined speed is the speed at which the focus detector is to calculate the defocus amount a predetermined number of times in a section between the defocus amount corresponding to the second position and a defocus amount corresponding to a third position which is nearest to the focus lens driving target position and in which the focus detector is to acquire an effective defocus amount.

* * * * *